United States Patent [19]

Harder

[11] 4,136,223
[45] Jan. 23, 1979

[54] PLATE-SHAPED ROOFING ELEMENT
[75] Inventor: Sven Harder, Albertslund, Denmark
[73] Assignee: A/S Hotaco, Holbaek, Denmark
[21] Appl. No.: 894,196
[22] Filed: Apr. 4, 1978
[51] Int. Cl.² .............................................. B32B 3/10
[52] U.S. Cl. ..................................... 428/139; 156/79; 428/314; 428/320
[58] Field of Search ........ 428/137, 138, 139, 141–150, 428/310, 313, 314, 320, 321; 156/79

[56] References Cited
U.S. PATENT DOCUMENTS

| 3,365,322 | 1/1968 | Hinds ................................. 428/145 |
| 3,372,083 | 3/1968 | Evans et al. ........................ 428/149 |
| 3,492,196 | 1/1970 | Moore ................................. 428/321 |
| 3,867,494 | 2/1975 | Rood et al. ......................... 428/310 |
| 3,874,980 | 1/1975 | Richards et al. ................... 428/313 |
| 4,072,788 | 2/1978 | Herweg et al. .................... 428/313 |

Primary Examiner—William J. Van Balen
Attorney, Agent, or Firm—Haseltine, Lake & Waters

[57] ABSTRACT

Plate-shaped roofing element comprising: adhesive foam plastic having a surface facing upwards in a mounted position and having a covering plate comprised of bituminous roofing felt with surface facing the element being covered with a layer of gravel or pebbles, and a layer of glass fiber contacting said surface of said roofing felt and having through holes through which the adhesive foam plastic during foaming becomes adherent to said bituminous roofing felt.

1 Claim, 2 Drawing Figures

PLATE-SHAPED ROOFING ELEMENT

BACKGROUND OF THE INVENTION

The invention relates to a roofing element of the type essentially consisting of adhesive foam plastic whose surface facing upwards in the mounted position is provided with a covering plate. It has been difficult with the heretofore known roofing elements of this type to obtain an adequate stability to changing moisture and temperatures and the consequent variations in pressure under the roofing felt. The object of the present invention is to provide a roofing element obviating these drawbacks and being mechanically solid.

SUMMARY OF THE INVENTION

This is achieved according to the invention by shaping the roofing element so that the covering plate is composed of a bituminous roofing felt, whose surface facing the element is covered with gravel or pebbles, and a layer of glass fibre contacting said surface of the roofing felt and provided with through holes through which the adhesive foam plastic during foaming, has been caused to adhere to the bituminous roofing felt.

The fact that said layer of glass fiber is provided with holes makes it possible to force the foam plastic during foaming up through the holes and to adhere firmly to the pebble or gravel coating of the roofing felt. By this spot securing of the roofing felt there is provided an effective securing of the roofing felt and a pressure equalization so that the element is mechanically completely stable, and thus there is no risk of bulges owing to vapor pressures generated by varying temperature and moisture conditions.

Holes may be cut in the usual manner in the roofing felt down to the pebble or gravel layer to provide "breathing", and, optionally, ventilation caps may be fitted above such holes. Additional layers of roofing felt and other insulation may be placed on top of the roofing felt in the usual manner.

The invention will be described in detail below with reference to the drawing wherein

DESCRIPTION OF THE PREFERRED EMBODIMENTS

Figure 1:
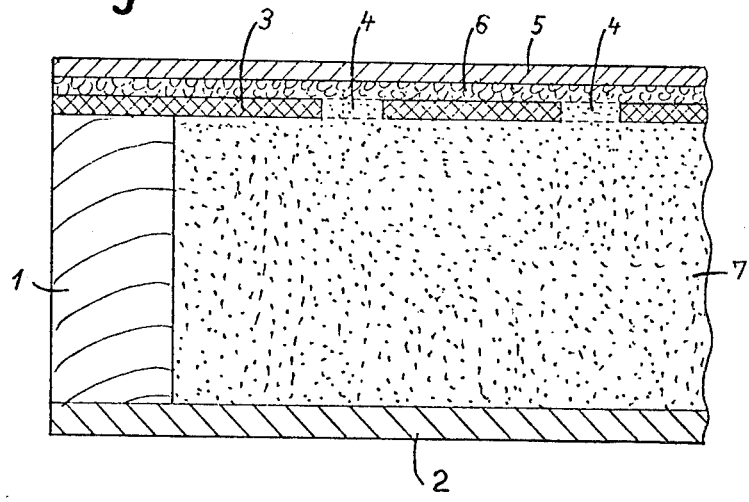
FIG. 1 is a section of a portion of a roofing element according to the invention.

FIG. 1 shows a portion of a roofing element essentially constituted by a foamed plastic material 7 enclosed by a frame 1. The frame is provided with a base 2, and the top face of the element is covered by a plate consisting of a layer of glass fiber 3 with a number of holes 4, and a layer of roofing felt 5 placed above the layer of glass fiber and having a coating of pebbles or coarse gravel 6 on its underface. The foam plastic material 7 has penetrated up through the holes 4 in the glass fiber material 3 so that the adhesive foam plastic adheres directly to the coating of coarse gravel or pebbles 6 present on the underface of the roofing felt 5. The foam plastic may be of any appropriate type, however, preferably polyurethan foam.

Figure 2:
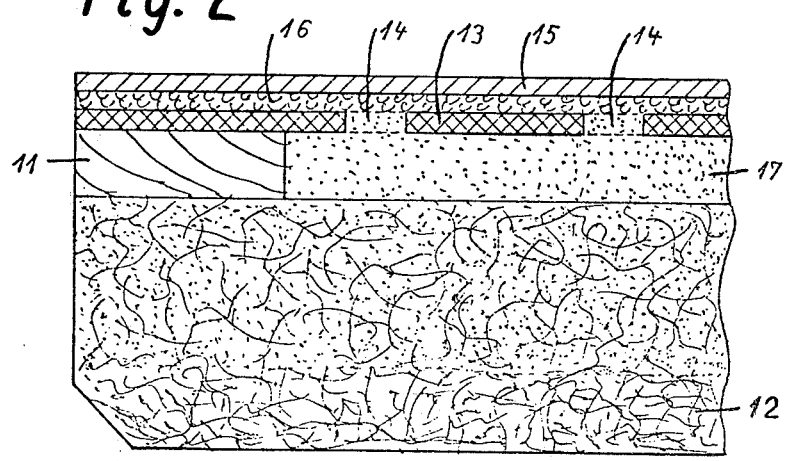
FIG. 2 is a corresponding section of another embodiment.

FIG. 2 shows an embodiment of a roofing element having a comparatively low frame 11 and a thick base plate 12 consisting of a coarse fiber material, preferably wood wool with cement as binding agent. A layer of glass fiber material 13 with holes 14 is provided on the top face of the element, and the glass fiber layer is covered by a layer of roofing felt 15 having a coating of coarse gravel or pebbles 16 on the underface.

Within the frame there is provided adhesive foam plastic 17 introduced in such an amount as to generate a sufficient pressure during the foaming to make the foam plastic not only flow up through the holes 14 and adhere to the gravel or pebble layer 16, but also to flow a considerable distance down between the fibers in the base plate 12 so that there is an intimite bond between the foam plastic and the base plate whose cavity in the upper portion of the plate is filled with the foam plastic. As, however, the lower portion of the base plate is free from foam plastic, the plate keeps its sound absorbing property, and the heat insulating capacity of the entire element is substantially better than that of the heretofore elements of a similar type.

What I claim is:

1. Plate-shaped roofing element comprising: adhesive foam plastic having a surface facing upwards in a mounted position and having a covering plate comprised of bituminous roofing felt with surface facing the element being covered with a layer of gravel or pebbles, and a layer of glass fiber contacting said surface of said roofing felt and having through holes through which the adhesive foam plastic during foaming becomes adherent to said bituminous roofing felt.

* * * * *